United States Patent

[11] 3,629,101

[72] Inventors Martin Hille
    Bad Soden, Taunus;
    Dieter Ulmschneider, Frankfurt am Main,
    both of Germany
[21] Appl. No. 802,199
[22] Filed Feb. 25, 1969
[45] Patented Dec. 21, 1971
[73] Assignee Farbwerke Hoechst Aktiengesellschaft
    vormals Meister Lucius & Bruning
    Frankfurt am Main, Germany
[32] Priority Mar. 2, 1968
[33] Germany
[31] P 16 08 267.0

[54] WATER-BASE CLAYEY DRILLING FLUIDS
    6 Claims, No Drawings
[52] U.S. Cl. .................................................. 252/8.5 C,
    175/65, 260/79.3 M
[51] Int. Cl. ........................................................ C10m 7/00,
    E21b 21/04

[50] Field of Search ............................................ 252/8.5 C;
    175/65; 260/79.3 M

[56] References Cited
    UNITED STATES PATENTS
    3,025,234  3/1962  Canterino ..................... 252/8.5
    3,296,126  1/1967  Diener et al. .................. 252/8.5
    FOREIGN PATENTS
    1,044,956  1966  Great Britain ................ 260/79.3

Primary Examiner—Herbert B. Guynn
Assistant Examiner—Harris A. Pitlick
Attorney—Curtis, Morris & Safford ABSTRACT: Water-base, clayey drilling fluids are made suitable for the drilling of deep wells by addition thereto of a copolymer of vinyl-sulfonic acid and an N-vinyl-carboxylic acid amide or N-vinyl-pyrrolidone and, optionally, a small proportion of an anion-active vinyl compound that is polymerizable under the action of free radicals.

WATER-BASE CLAYEY DRILLING FLUIDS

The present invention relates to an improved drilling fluid for use in drilling oil and gas wells.

In the drilling of deep wells, elutions of clay in water, so-called water-base clayey fluids, are used for transporting and carrying the cuttings out from the bore hole. In addition, oil and oil-invert-emulsion fluids are used. Clayey fluids on water base may contain oil in emulsified form. Pure clay suspensions are not sufficiently stable under deep well drilling conditions. The rising temperature and the electrolytes encountered when drilling through corresponding formations cause the clay to separate in flocks from the drilling fluid, which renders the drilling fluids unusable.

In order to stabilize the drilling fluids, protective colloids are being used. As such protective colloids, starch, starch derivatives and cellulose derivatives such as carboxymethylcellulose are used to a large extend in drilling fluids. As synthetic products having a stabilizing action, polymers of acrylic acid and/or acrylic acid amide have occasionally been used. For controlling the flow properties of drilling fluids, lignosulfonates and lignites are often added as liquifiers.

However, the drilling of extremely deep wells, which is increasingly performed in the last years, also has increased the requirements high temperature stable protective colloids have to satisfy. Starch and starch derivatives have the disadvantage of being susceptible to bacterial decomposition. In addition, at temperatures exceeding 120° C., they lose quite rapidly their properties as protective colloid, so that their use is limited to certain drilling depths. This temperature limit is higher for cellulose derivatives such as carboxymethylcellulose; these can be used up to maximum borehole temperatures of 160° to 180° C. Polyacrylamide/polyacrylates are stable at still higher temperatures. They have the disadvantage, however, of being highly susceptible to the hardness formers of water. Polyacrylate is precipitated already by small amounts of calcium ions. Polyacrylamide hydrolyzes at high temperatures and alkaline pH-values to polyacrylic acid. Thus, the protective colloids of the polyacrylamide-polyacrylate type can practically not be used in drilling fluids when drilling is carried out in mountains with anhydrite layers which occur very often, as well as in drilling fluids which have to pass through salt layers from which almost always calcium and magnesium ions penetrate into the drilling fluid.

Purely cationactive protective colloids, for example, poly-N-vinyl-carboxylic acid amides, the use of which has already been proposed for water-base clay drilling fluids, have not attained practical importance. Their application results in a change of the charge of the suspended particles; therefore, such systems can be kept stable with great difficulty only owing to the continuous absorption of electronegative particles during the drilling process. Flocculation of clay and precipitations of weighting substances such as barium sulfate take place.

Now we have found that the above-described disadvantages can be avoided and that water-base clayey drilling fluids that are suitable for the drilling of deep wells can be obtained by adding to the aqueous drilling fluids as protective colloids copolymers of vinylsulfonic acid and a N-vinyl-carboxylic acid amide or N-vinyl-pyrrolidone and optionally small proportions of an anion-active vinyl compound that is polymerizable under the action of free radicals. As protective colloids there may also be used such copolymers of the above-mentioned kind whose carboxylic acyl groups are partially or completely removed by hydrolysis.

Thus the copolymer to be used according to the invention is built from anionic and weakly cationic monomers. As weakly cationic N-vinyl-carboxylic acid amides there may be used especially those of lower alkane-carboxylic acids having in particular one to three carbon atoms. In particular, there may be used vinyl-carboxylic acid amides of the formula

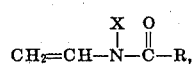

in which R and X represent hydrogen or lower alkyl radicals, especially methyl or ethyl radicals. N-vinyl-N-methyl-formamide, N-vinyl-acetamide, N-vinyl-N-ethyl-acetamide and N-vinyl-pyrrolidone or mixtures of these vinyl compounds are preferably used.

In the copolymers, the ratio of the vinylsulfonic acid to the N-vinyl-carboxylic acid amides or to N-vinyl-pyrrolidone may vary within wide limits. In general, the ratio of the anionic to the weakly cationic monomers is in the range of from about 1:4 to 4:1, preferably 2:3 to 3:2, parts by weight.

The copolymers may optionally contain, as further component, small proportions of anion-active vinyl compounds which are polymerizable under the action of free radicals. As such anion-active vinyl compounds to be incorporated by polymerization, there may be mentioned, for example acrylic acid, methyl-acrylic acid or vinylphosphonic acid. The quantity of this third component which may be incorporated by polymerization is in general up to about 15 percent, at maximum up to about 40 percent, referred to total weight of the other monomers. If such a third component is incorporated by polymerization, its proportion is in most cases smaller than half of the amount of the vinylsulfonic acid used. For the use of the copolymers according to the invention, the carboxylic acid radical of the N-vinyl-carboxylic acid amides is not decisive. Thus for the application as protective colloids according to the invention, there are also suitable such copolymers of the mentioned monomers whose carboxylic acid radicals have been partially or completely removed by alkaline or acid hydrolysis.

The copolymers to be used according to the invention can be prepared by known processes, advantageously by polymerization of the monomers under the action of free radicals in aqueous phase. As catalysts, there may be used in particular azoisobutyric acid dinitrile and hydrogen peroxide/ammonia. Advantageously, polymers having an as high average molecular weight as possible are used for the purpose of the invention. As measure for the molecule size of the copolymers, the K-value may be used (cf. H. Fikentscher, "Cellulosechemie" 13 (1932), page 58). The K-value of the copolymers to be used according to the invention should be in the range of from 50 to about 150, preferably 85.

For preparing the drilling fluids, the copolymers to be used according to the invention as protective colloids are applied in the quantities in which such protective colloids are conventionally used. In general, about 1 to 50 kg., preferably 5 to 30 kg., per m.³ of drilling fluid are used.

The copolymers used according to the invention as protective colloids remain active at temperatures of above 220° C. Therefore, they are also well suitable as clayey drilling fluids in the drilling of extremely deep wells, in which such high temperatures occur. These protective colloids also have proved extraordinarily stable to alkaline earth metal ions. Their properties are otherwise largely similar to those of carboxymethylcellulose which has been well proved in drilling fluids; they are clearly superior to the latter with regard to resistance to high temperatures.

In the following part, some examples of copolymers used according to the invention as protective colloids and of aqueous drilling fluids on the base of clay prepared with them are given. Furthermore, the results of filtration tests effected with these clayey fluids are also shown.

A measure of the stability of drilling fluids is their filterability according to the "API-Code 29." The quality of the drilling fluid is judged by the "water-loss" in the filtration test. The water-loss is the quantity of water which passes within a determined period of time (30 minutes) at an applied pressure (100 p.s.i.) through a standard 9 cm. round filter paper Whatmann No. 50. The smaller the quantity of passing water is, the better is the stability of the drilling fluid. The test is carried out at room temperature. A filtration test with a fresh water drilling fluid containing 6 percent of bentonite without addition of protective colloids gives a water loss of 20.4 cm.³ (blind value).

The following examples illustrate the invention but they are not intended to limit it thereto:

EXAMPLE 1

Protective colloid
 Copolymer of 35 parts by weight of N-vinyl-N-methyl-acetamide and 65 parts by weight of sodium vinyl-sulfonate (K-value 75.8).

EXAMPLE 2

Protective colloid
 Copolymer of 70 parts by weight of N-vinyl-N-methyl-acetamide and 30 parts by weight of sodium vinyl-sulfonate (K-value 115).

EXAMPLE 3

Protective colloid
 Copolymer of 50 parts by weight of N-vinyl-pyrrolidone and 50 parts by weight of sodium vinylsulfonate.

EXAMPLE 4

Protective colloid
 Copolymer of 50 parts by weight of N-vinyl-N-methylformamide and 50 parts by weight of sodium vinyl-sulfonate.

EXAMPLE 5

Protective colloid
 Copolymer of 50 parts by weight of N-vinyl-N-methyl-acetamide, 45 parts by weight of sodium vinyl-sulfonate and 5 parts by weight of acrylic acid.

EXAMPLE 6 a. Protective colloid
 A copolymer of 55 parts by weight of N-vinyl-N-methyl-acetamide and 45 parts by weight of sodium vinylsulfonate (K-value 89.6) was boiled for 3 hours with a N/1 sodium hydroxide solution. The solution containing the the hydrolyzed product was then neutralized and used for the preparation of drilling fluids.

b. Protective colloid
 A copolymer of 55 parts by weight of N-vinyl-N-methyl-acetamide and 45 parts by weight of sodium vinyl-sulfonate (K-value 89.6) was boiled for 3 hours with N1 sulfuric acid solution. The solution containing the hydrolyzed product was then neutralized and used for the preparation of drilling fluids.

Results of filtration tests
 Fresh-water clayey drilling fluids containing 6 percent by weight of bentonite and an additive according to examples 1 to 6 were tested in filtration tests according to the API-Code 29. The results were as follows:

| Protective colloid according to example | Quantity added % by weight | Water-loss cc. |
| --- | --- | --- |
| 1 | 0.3 | 14.5 |
| 2 | 0.3 | 10.5 |
| 3 | 0.5 | 15.0 |
| 4 | 0.5 | 11.0 |
| 5 | 0.5 | 14.0 |
| 6a | 0.5 | 11.0 |
| 6b | 0.5 | 11.2 |
| blind value | — | 20.4 |

In the following examples 7 and 8, a protective colloid of the present invention (copolymer A) was tested with regard to the stability to calcium ions of the drilling fluids prepared with it and compared with that of B. poly-N-vinyl-N-methyl-acetamide and with
C. a copolymer of 25 parts by weight of acrylic acid amide and 75 parts by weight of acrylic acid.

As "copolymer A" according to the invention, a copolymer of 50 parts by weight of vinyl-sulfonic acid and 50 parts by weight of N-vinyl-N-methyl-acetamide having a K-value of 89.2 was used.

EXAMPLE 7

Fresh-water clayey drilling fluids having a content of 6 percent by weight of bentonite and 1 percent by weight of protective colloid.

| Protective colloid | Water loss cm.³ |
| --- | --- |
| Copolymer A | 7.5 |
| B. Poly-N-vinyl-N-methyl-acetamide (K-value 85) | 14.0 |
| C. Poly-acrylamide/acrylic acid (1:2) | 7.5 |

EXAMPLE 8

Clayey drilling fluid containing 6.0 percent by weight of bentonite, 0.7 percent by weight of calcium chloride and 1 percent by weight of protective colloid.

| Protective colloid | Water loss cm.³ |
| --- | --- |
| Copolymer A | 9.5 |
| B. Poly-N-vinyl-N-methyl-acetamide (K-value 85) | 13.8 |
| C. Polyacrylamide/acrylic acid (1:2) | 17.0 |

The results of the comparative tests clearly show that the clayey drilling fluids prepared with copolymer A according to the invention as protective colloid have a considerably better stability to alkaline earth metal salts.

We claim:

1. A water-base clayey drilling fluid containing from about 1 to 50 kg. per m.³ of a protective colloid copolymer of monomers
 A. vinylsulfonic acid and
 B. N-vinyl-pyrrolidone or N-vinyl-carboxylic acid amide having the formula

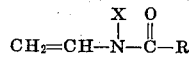

in which R and X represent hydrogen or lower alkyl, the ratio of said monomers being from 1 to 4 parts by weight of vinyl-sulfonic acid to 4 to 1 parts by weight of N-vinyl-carboxylic acid amide or N-vinyl-pyrrolidone, said copolymer having a K-value in the range of from 50 to about 150.

2. A water-base clayey drilling fluid as defined in claim 1, wherein the protective colloid is a copolymer of vinylsulfonic acid and N-vinyl-N-methyl-acetamide.

3. A water-base clayey drilling fluid as defined in claim 1, wherein the protective colloid is a copolymer of monomers A, B and up to 40 percent, calculated on the weight of monomers A and B, of an anion-active vinyl compound selected from the group consisting of acrylic acid, methacrylic acid and vinyl-phosphonic acid.

4. A water-base clayey drilling fluid as defined in claim 1, wherein the carboxylic acyl radicals of the copolymer are removed partially or completely by hydrolysis.

5. A water-base clayey drilling fluid as defined in claim 1, wherein the protective colloid is a copolymer of vinylsulfonic acid and N-vinyl-pyrrolidone.

6. A water-base clayey drilling fluid as defined in claim 1, wherein the protective colloid is a copolymer of vinylsulfonic acid and N-vinyl-N-methyl-formamide.